(12) United States Patent
Parry (10) Patent No.: US 6,652,169 B2
(45) Date of Patent: Nov. 25, 2003

(54) METHOD AND SYSTEM FOR PRINTER SUGGESTED UPGRADES TO CORRECT ERRORS

(75) Inventor: Travis J. Parry, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/079,664

(22) Filed: Feb. 20, 2002

(65) Prior Publication Data

US 2003/0156874 A1 Aug. 21, 2003

(51) Int. Cl.[7] .............................. B41J 3/42; B41J 5/30; B41J 11/44; G06K 15/00
(52) U.S. Cl. ............................ 400/74; 400/61; 400/76; 400/582; 358/1.14; 358/1.15
(58) Field of Search ......................... 400/74, 76, 582, 400/61, 54; 358/1.14, 1.15

(56) References Cited

U.S. PATENT DOCUMENTS

| 5,027,154 A | | 6/1991 | Ujiie et al. .................... 355/77 |
|---|---|---|---|
| 5,323,393 A | * | 6/1994 | Barrett et al. ............... 370/85.8 |
| 5,467,434 A | * | 11/1995 | Hower, Jr. et al. ......... 395/114 |
| 5,620,264 A | | 4/1997 | Kagita .......................... 400/74 |
| 5,625,757 A | | 4/1997 | Kageyama et al. ......... 358/1.14 |
| 5,802,260 A | * | 9/1998 | Shimakawa et al. ....... 358/1.15 |
| 5,867,714 A | | 2/1999 | Todd et al. .................. 717/172 |
| 5,897,252 A | * | 4/1999 | Kanakubo .................... 400/74 |
| 5,956,487 A | | 9/1999 | Venkatraman et al. ...... 709/218 |
| 6,049,671 A | | 4/2000 | Slivka et al. ................ 717/173 |
| 6,115,132 A | * | 9/2000 | Nakatsuma et al. ........ 358/1.14 |
| 6,185,379 B1 | | 2/2001 | Lay et al. ...................... 399/11 |
| 6,256,668 B1 | | 7/2001 | Slivka et al. ................ 709/220 |

* cited by examiner

Primary Examiner—Andrew H. Hirshfeld
Assistant Examiner—Wasseem H. Hamdan (57) ABSTRACT

Methods and apparatus for suggesting upgrades in response to printer errors. In one embodiment, a printer contains an error detecting device and an embedded Web server in communication with a global computer network. If printer errors are detected, error messages are generated. Each error message is conveyed through the embedded Web server to an external computer. The external computer may receive error information conveyed by a large number of printers, which can optionally be monitored and analyzed. Information on a selection of printer upgrades is maintained in a memory of the external computer. The external computer compares each error message received to this selection, if an upgrade corresponding to an error message is available, the system conveys a message detailing the availability of the upgrade.

18 Claims, 3 Drawing Sheets

METHOD AND SYSTEM FOR PRINTER SUGGESTED UPGRADES TO CORRECT ERRORS

FIELD OF THE INVENTION

The present invention relates generally to printers and methods selecting upgrades to correct printer errors. More specifically, the present invention relates to the suggesting printer upgrades in response to the generation and communication of printer error messages to reduce the future occurrence of printer errors.

BACKGROUND OF THE INVENTION

Printers are well known computer peripherals widely used in both home and business computing environments. Printer technology has made rapid advances over recent years. State of the art printers offer ever increasing levels of speed, print quality, easily manipulated format options, and a wide variety of features, such as document collating, stapling, and various levels of print quality. Printers using Inkjet or laser technology are capable of reproducing almost any image. As printer technology advances, the process of printing a document from a computer workstation involves ever increasing numbers of steps. Errors can occur at any of these steps. It has become common practice to keep an "error log" in the printer memory, to track printing errors and technical problems. The repair of inoperable or damaged printers can be aided by examining the error log for patterns of errors occurring prior to breakage.

As it is used herein, the term "printer" signifies any device capable of providing printer function alone or, alternatively, any device providing printer function in combination with one or more other document processing functions, such as, for example, copying, scanning, or facsimile capabilities.

Printer manufacturers often provide technical support for printing devices, including software, hardware, and firmware upgrades to resolve problems that users have encountered with printers. Unfortunately, many printers are either underutilized or inefficiently utilized as users do not understand, or are not informed, of these potential upgrades, which can allow for more trouble free printer usage. A user must be aware of both that printer errors are of the type that would benefit from an upgrade and of the availability of such an upgrade. Learning the details of available upgrades has traditionally required a user to research the manufacturer's website, or printed materials, to examine all available printer related upgrades and then check their details for desired characteristics. Monitoring printer error patterns requires users to keep track of all printer errors, which is may be impracticable for some networked printers, or to examine and understand the printer error log. These activities may be beyond the abilities or merely beyond the "comfort level" of a casual computer user.

Printers are known in the art that provide instructions to the user for correcting simple physical problems, such as replacing an empty toner bottle or clearing a paper jam. U.S. Pat. No. 6,185,379, issued Feb. 6, 2001 to Lay et al., and U.S. Pat. No. 5,027,154 issued Jun. 25, 1991 to Ujiie et al. describe such printers, and are incorporated herein by reference. For more complex physical problems or other errors however, these systems merely advise the user to contact a repair service. These printers thus fail to provide information on the availability of upgrades that may lessen the recurrence of an error. A system or method that is capable of suggesting an upgrade that may lessen the occurrence of a printer error, in response to that error would be a substantial improvement in the art.

SUMMARY OF THE INVENTION

The present invention provides methods and apparatus for suggesting upgrades to ameliorate printer errors, in response to specific printer errors as they occur. In one embodiment, a printer contains an error detecting device and an embedded Web server in communication with a global computer network. If printer errors are detected, error messages are generated. Each error message is conveyed through the embedded web server to a remote computer. The remote computer may receive error information conveyed by a large number of printers, which can optionally be monitored and analyzed. Information on a selection of printer upgrades is maintained in a memory of the remote computer. The remote computer compares each error message received to this selection, if an upgrade corresponding to an error message is available, the system conveys a message detailing the availability of the upgrade. Methods of the present invention include providing a printer incorporating an error detector, linked to a network. The error detector monitors print jobs sent to the printer, generating an error message when an error is detected. Error messages are conveyed through the network to a remote computer where an ameliorative upgrade may be selected.

DETAILED DESCRIPTION OF THE INVENTION

The present invention provides methods and apparatus for suggesting upgrades in response to printing errors. In a preferred embodiment, the present invention makes use of an embedded Web server incorporated in a printer and a error detector to carry out the methods described herein.

It will be appreciated by those skilled in the art that the embodiments herein described while illustrating certain embodiments are not intended to so limit the invention or the scope of the appended claims. Those skilled in the art will also understand that various combinations or modifications of the preferred embodiments could be made without departing from the scope of the invention.

In a typical printing process over a network environment, a user at a computer workstation typically uses print driver software to load documents or images into a buffer (usually an area on a disk of a workstation), where a printer pulls them off the buffer at its own rate. The print driver functions to convert the text, graphics and print attributes specified by the user's workstation into a set of codes that the printer can translate and/or read. The set of codes is typically a version of Printer Control Language (PCL), developed by Hewlett-Packard for its dot-matrix, inkjet, and LaserJet series printers. The version of PCL most commonly used as the printer coding language is Page Description Language (PDL). Once the text, graphics and print attributes have been converted to PDL, the PDL is transmitted by the workstation over the network where it is received by the printer as a Aprint job.@ Examples of PDL's include HP-GL/2 language of Hewlitt-Packard, Inc. and PostScript of Adobe.

As the printer receives the coded language from the print driver, it stores the information in high capacity memory storage (job retention), which typically comprises random-access memory (RAM) or a hard disk. A stored print job thus comprises one or more electronically stored files and the print attributes associated therewith. Before a typical print job (e.g., a PDL file) can be printed, however, its contents must be converted to a bit-mapped image format, also known as a raster image. The raster image is a bit-mapped representation of the document to be printed, with each bit in the bitmap representing the absence or presence of a dot (or pixel) on the printed page. A raster image processor (ARIP@) in the printer typically translates PDL files to a raster image, also called a ARIP'ed@ version of the file. Thus, the print files include data representing graphical images and the RIP'ed version is generated from the print file. Typically, print jobs are RIP'ed before storage in job retention, making them Aprint ready files.@ In some cases, print jobs are received by the printer in the form of raster image data. In that case, a processor in the printer may engage in pixel image manipulation when storing the print job. The printer then uses the data in the print ready file to control the mechanical printing components and the printing steps, such as paper feeding, controlling the inkjets of an inkjet printer or the laser scanning assembly and revolving drum and other associated mechanism of a laser printer. Errors can be introduced into the process at any of the above steps.

Figure 1:
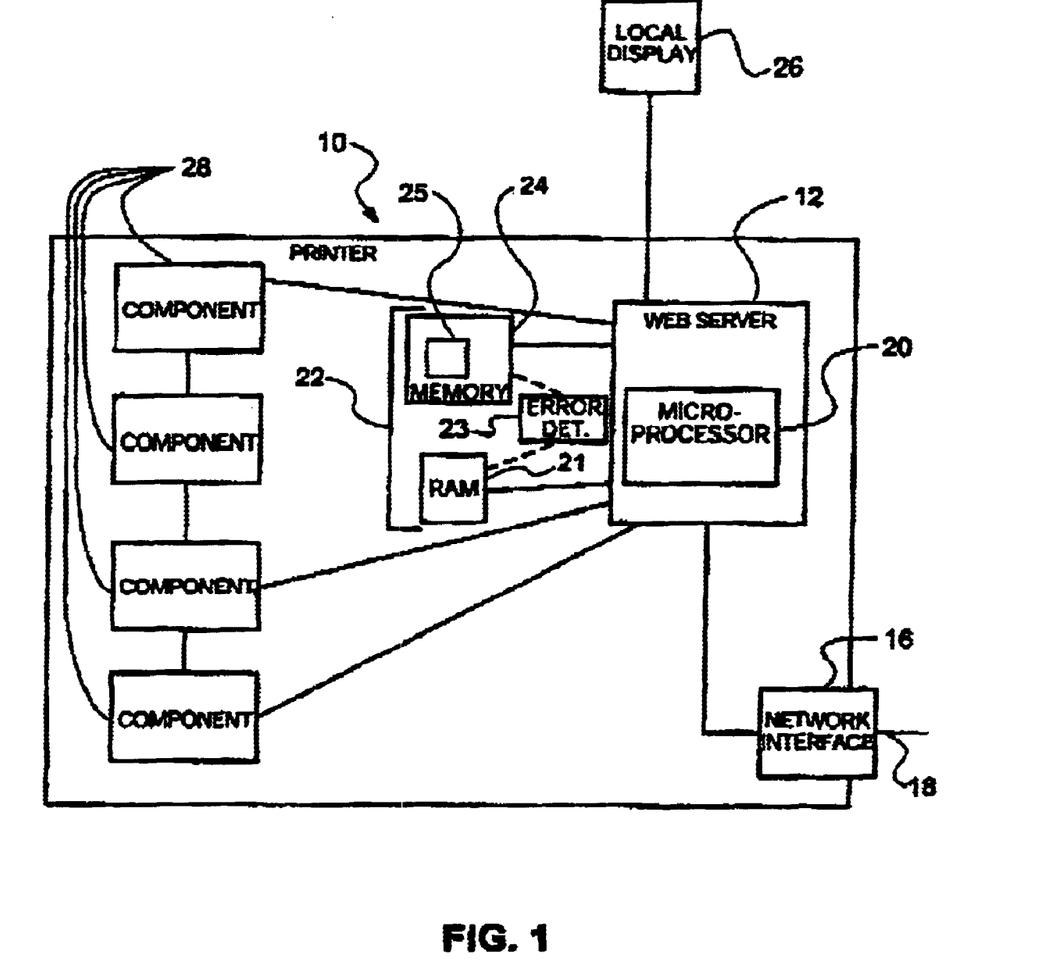
FIG. 1 is a block diagram of a printing device configured with an embedded Web server for use in the methods and system of the present invention.

Referring to drawing FIG. 1, one possible embodiment of a preferred printer 10 for carrying out the methods of the present invention is shown. Printer 10 is configured with both printer specific hardware and software and an embedded Web interfacing system (e.g., a Web server 12) for enabling access and interaction with other devices linked to local and external communication networks (Anetworks@), including the World Wide Web (the AInternet@), a local area network (LAN), a wide area network (WAN), an intranet, the computer network of an online service, etc. The printer specific hardware and software of printer 10 may be provided in any conventional printer configuration known in the art, including those associated with laser printers, impact printers, photographic printers, and inkjet printers. Printer 10 optionally may include one or more local displays 26, which may comprise a conventional monitor, a monitor coupled with an integrated display, an integrated display (e.g., an LCD display), or other means for viewing print queues, print attributes, and associated data or processing information, including printer specific information. Printer 10 also includes a network interface (I/O) 16 for bidirectional data communication through one or more and preferably all of the various networks (LAN, WAN, Internet, etc.) using communication paths or links known in the art, including wireless connections, ethernet, bus line, Fibre Channel, ATM, standard serial connections, and the like.

In a most preferred embodiment, the embedded Web interfacing system comprises a Web server 12 providing one or more Web server functions to requesting users linked by way of one or more of the various networks (LAN, WAN, Internet, etc.). The preferred printer 10 of the present invention may thus be the same or conceptually similar to the printer apparatus configured with an embedded Web server described in U.S. Pat. No. 5,956,487 to Venkatraman et al., assigned to the assignee of the present invention, the disclosure of which is incorporated by reference herein in its entirety.

Still referring to drawing FIG. 1, the embedded Web server 12 of one preferred embodiment of the present invention is preferably housed in printer 10 on a single microprocessor board (not shown), which includes a microprocessor 20 responsible for controlling all aspects of Web server 12. Thus, microprocessor 20 is configured to process communication protocols and executable programs associated with Web server 12 which are stored in ROM (not shown) and/or hard disk memory 24. In one preferred embodiment, Web server 12 uses microprocessor 20 and the ROM-stored protocols to exchange data with other devices/users on one or more of the networks via Hyper Text Transfer Protocol (HTTP) and Simple Mail Transfer Protocol (SMTP), although other protocols such as File Transfer Protocol (FTP), Simple Network Management Protocol (SNMP), and Gopher document protocol may also be supported. Web server 12 is further configured to send and receive HTML formatted files. In addition to being linked to a local area network (LAN) or wide area network (WAN), printer 10 may be linked directly to the Internet via network interface 16 and communication links 18 attached thereto.

Microprocessor 20 is preferably part of the existing circuitry associated with a conventional printer. As such, microprocessor 20 is preferably configured to perform some or all of the printer specific functions of printer 10, including control of printer specific hardware and software.

Microprocessor 20 is provided with memory 22 in the form of RAM 21 and/or hard disk memory 24, which may be associated with the print cache of printer 10, or which may be provided separately from the print cache. As used herein, printer memory designated for temporarily or permanently storing one or more print jobs on hard disk memory 24 or other data storage device in printer 10 is referred to as Ajob retention@ 25. In one embodiment, a percentage of memory 22 in printer 10 may be dedicated to Web server 12. Alternatively, Web server 12 may share the available memory 22 in printer 10 with the print cache. Preferably, printer 10 will be equipped with a minimum of 64 megabytes of RAM 21, although less RAM may be used in certain configurations.

Preferably, microprocessor 20 of printer 10 is configured to translate coded language received from printer drivers of networked workstations into a bit-mapped image format (raster image format), and to store the translated print files in high capacity memory storage (i.e., job retention 25). Thus, the resulting ARIP'ed@ print jobs, representing graphical images of text or drawings along with associated print attributes, are stored in job retention 25 as Aprint ready files."

Printer 10 will preferably contain executable software programs stored on hard disk memory 24 related to the operation of Web server 12. Hard disk memory 24 may also contain printer specific software programs relating to the operation of printer specific hardware. Alternatively, a separate hard disk (not shown) may optionally be provided with the requisite software programs for printing.

An error detector 23 located within the printer 10 is monitors each step of the process of receiving, translating, storing and printing a print job. Preferably error detector 23 functions as microprocessor 20 follows a set of instructions retained in memory 22 to check for errors at each step of the process of receiving, translating, storing and printing a print job. Alternatively, error detector 23 could be an additional processor which is solely dedicated to the error detection function. It will be appreciated that any method or system known, now or in the future, to those skilled in the art may be used to detect the errors from which error messages are generated. All such methods and systems are included within the scope of the present invention. Examples of some possible error detectors, among others which may be used in the present invention, are disclosed in U.S. Pat. No. 5,620,264, issued Apr. 15, 1997 to Kagita, and U.S. Pat. No. 5,625,757, issued Apr. 29, 1997 to Kageyama et al., each of which is incorporated herein by reference.

It is preferred that the error detector generate a stack trace for each error detected. The stack trace is a record that may be stored in memory 22, preferably as part of a printer error log. As a print job is performed, the instructions for performing that print job contained in the software, or firmware, controlling the printer are followed. This software may be expressed as a number of lines of code, each of which contains a statement or command for the printer to follow. Each line may be identified by an address identifying it by code number and line number, preferably this is expressed as a hexadecimal address. As each print job is performed, a program counter, counts the lines of code that are utilized by the microprocessor 20. The stack trace contains at least the address of the line of code that was executed at the time of the error. More preferably, it contains a history of the addresses of code lines performed in attempting to execute that print job, as well as other information such as the details of the print job, up to and including a copy of the print job itself. Errors may also be identified by a class to which an error code is assigned.

Mechanical components 28 of printer 10 are the mechanisms which are used to handle paper and print documents. Mechanical components 28 may include the paper feeding mechanism, the inkjets of an inkjet printer, the laser scanning assembly and revolving drum and other associated mechanisms of a laser printer, or other printing mechanisms known, now or in the future, to those skilled in the art.

Figure 2:
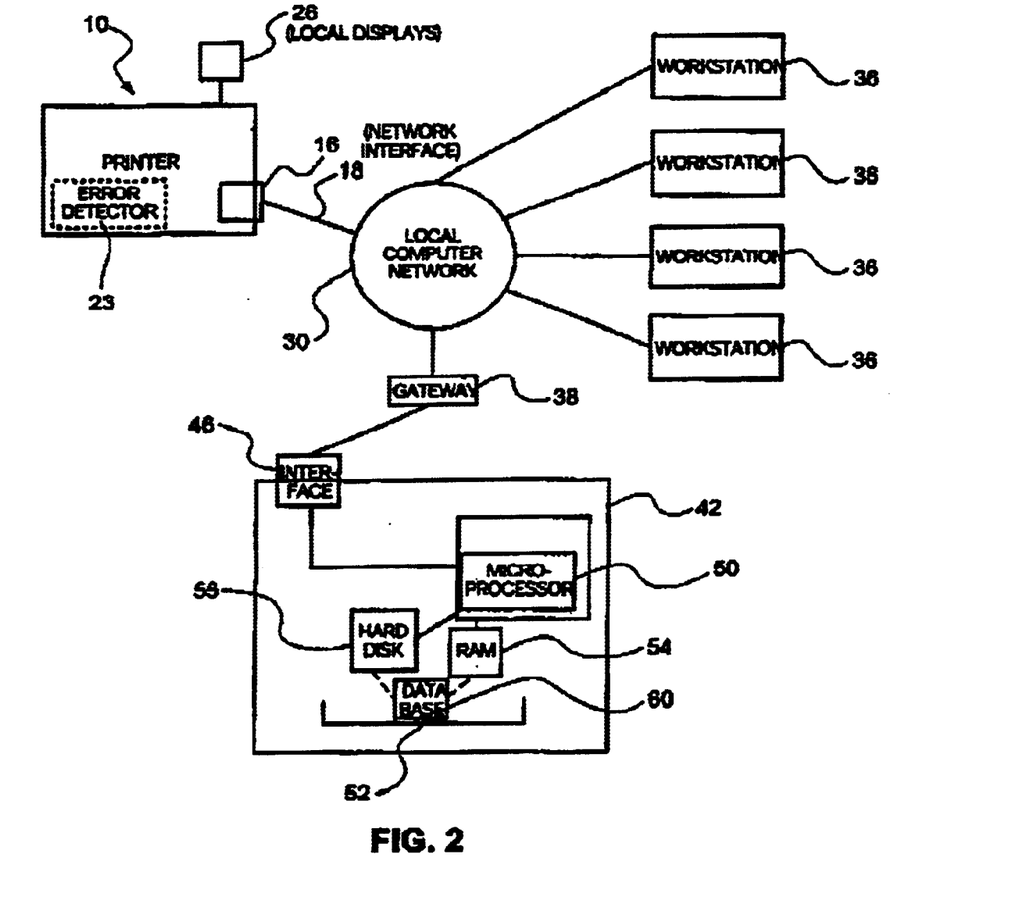
FIG. 2 illustrates a system of network components used in the methods and system of the present invention.

Referring now to drawing FIG. 2, printer 10 is shown as connected to a local computer network 30 to which are connected a number of computer workstations 36. Printer 10 is able to accept print jobs from each workstation 36 through network operative connections as known to those skilled in the art. Local computer network 30 also includes a gateway 38, which will typically comprise a software and/or hardware firewall. Gateway 38 functions to block various external data transmissions from being sent to locations residing inside local computer network 30. In this regard, gateway 38 may be restrictively configured to allow remotely situated users to access web pages within local computer network 30 (e.g., via HTTP protocols) and to block all other access. Gateway 38 also provides a port for outgoing Internet traffic. Gateway 38 is further preferably configured to internally route IP-Packets sent from workstations 36 to other web-based devices (e.g., printer 10) also residing within local computer network 30 and vice versa. It will be appreciated that the term network as used herein may include local network architecture 30, the internet and any other network, as known to those skilled in the art.

An external computer 42 includes an I/O interface 46 that allows connections to be made to a computer network, including an Internet or other connection, similar to network interface 16 discussed above. External computer 42 includes a microprocessor 50 which is provided with a memory 52. Memory 52 preferably includes RAM 54 and hard disk 55. Memory 52 may also include any other data storage devices or systems which are useful in practicing the present invention. External computer 42, preferably also includes input and output peripherals allowing user commands to be given an executed. Microprocessor 50 is configured to process error messages received through the I/O interface 46 and maintain information on a set of available printer upgrade packages in the memory 52. Some embodiments may additionally maintain a database 60 of error messages in the memory 52 as well. It will be appreciated that a system made in accordance with the principles of the present invention may include one or more external computers 42, as needed to handle receiving error messages from a plurality of printers 10, or as desired to handle other functions.

The information on a set of available printer upgrades preferably consists of a summary of the content of the upgrade, the printer condition the upgrade is intended to improve, information on where to obtain the upgrade, and a listing of printer errors that may be ameliorated by the installation of that upgrade. The listing may include a number of error message codes.

Figure 3:
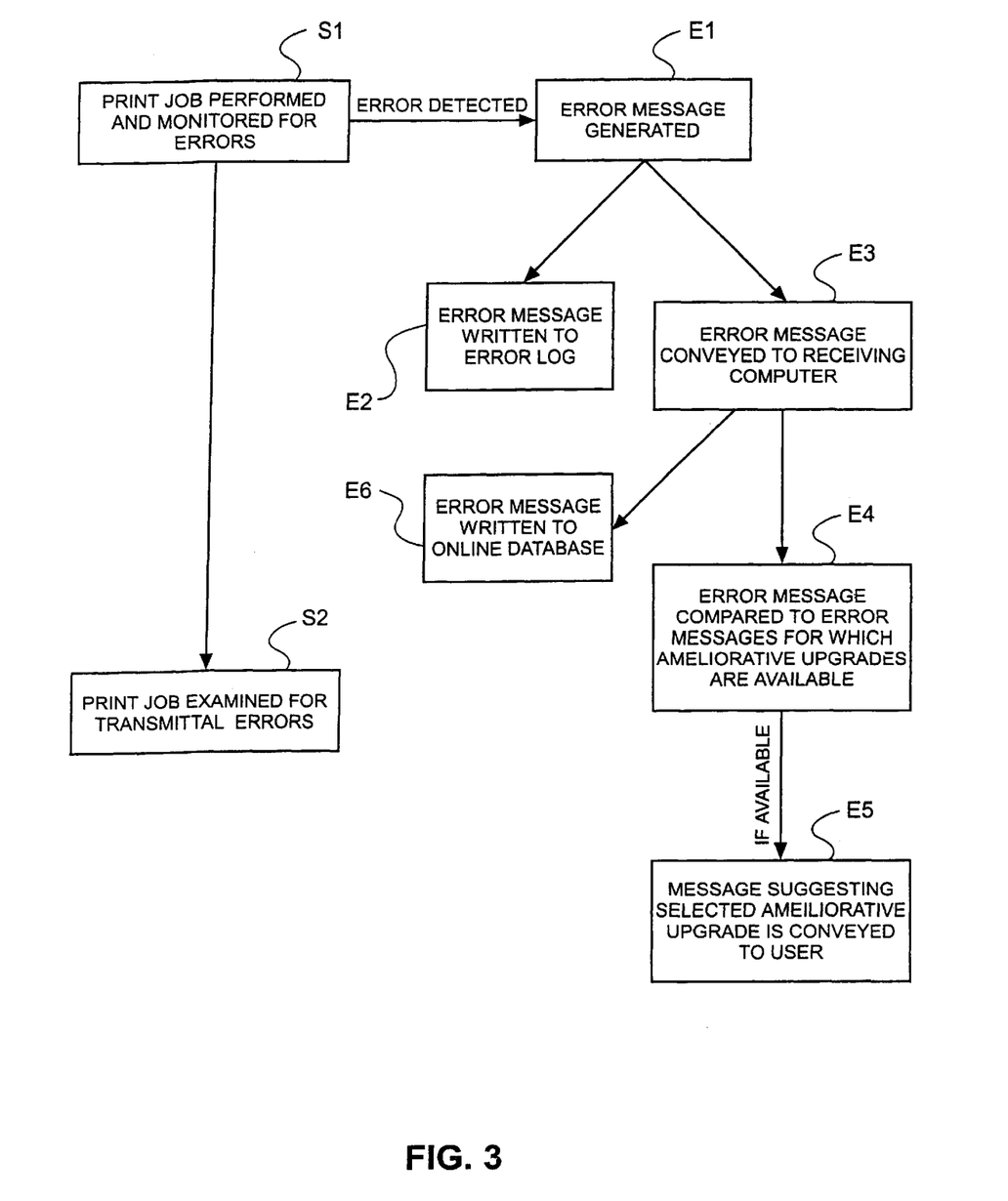
FIG. 3 is a flowchart showing a process of detecting printer error information and generating printer error messages that may be used by a remote computer to suggest ameliorative printer upgrades in one embodiment of a method of the present invention.

Turning to drawing FIG. 3, one possible embodiment of a process for detecting printer errors and suggesting an ameliorative upgrade is described. For illustrative purposes, this process will be discussed as it would take place in connection with the embodiment of drawing FIGS. 1 and 2, but it will be appreciated that the process may be used on any suitable system. Printer 10 receives and performs a print job. This may involve any or all of the steps discussed above. The print job is monitored for errors throughout the printing process by error detector 23, as shown by box S1. If no error is detected, no further action is needed, as shown by box S2.

If error detector 23 detects an error at any point from receiving and processing the print job to producing the printed document, an error message is generated as shown in box E1. The error message may be generated by the error detector 23, or by the Web server 12. In some preferred embodiments, the error message is then written into an internal error log that is kept in the memory 22 of the printer 10, as shown in box E2.

In embodiments that include it, Web server 12 then uses microprocessor 20 to convey the error message to external computer 42. If necessary, Web server 12 may be used to convert the error message into an appropriate format, such as an HTML file or an email message. Web server 12 then conveys the error message, in appropriate format, as one or more data packages (in accordance with a transfer protocol such as IP or TCP) to the network address of external computer 42, as shown in box E3. In an embodiment, such as that depicted in FIG. 3, this requires the data packets to be conveyed through network interface 16 and local computer network 30, over the internet (via gateway 38) to I/O interface 46 of external computer 42. External computer 42, which is preferably a network server, receives and assembles the data packet into the error message which is stored in memory 52. Preferably, the reception and assembly is accomplished by microprocessor 50. In embodiments that do not include a Web server 12, microprocessor 20 may be used to assemble an error message which is then conveyed over the local computer network 30 by another Web server. The error messages from a number of printers 10 may be all conveyed to the same network address, allowing external computer 42 to respond to error messages from any number of printers.

As error messages are generated, or conveyed by the Web server 12, they contain information about the error, such as the stack trace for that error, the type of printer error, the stage of printing at which the error occurred, the printer 10 component which generated or was involved in the error, any other desired information regarding the error, and preferably a predetermined error code identifying the error type. Additional information included in the error message, or added by the Web server 12 may include identifying information for the printer 10, such as the model of the printer 10 and the version of the printer software which is being used to control the printer 10. Optionally, the information may contain the printer 10 serial number, or information identifying the user or owner of the printer 10.

It is preferred that printer 10 be configured so that a user of the printer, such as a network administrator, may enable or disable the conveying of error messages to external computer 42. This will allow for the user to protect the error message data, if they decide such data should not be disclosed outside their network. Typically, users will be required to select a software upgrade for a printer 10 for receiving such error messages either by purchasing such an upgrade with the purchase of a printer or through software available to be installed after the purchase of a printer.

When an error message is received by external computer 42, the set of available upgrades is examined for an upgrade that corresponds to that error, as shown by box E4. Preferably, a stack trace in the error message is compared to a code line hexadecimal address associated with each of the available upgrades. If there is an available upgrade that removes the source of that error, reduces the recurrence of that error, improves the function of a component involved in that error, or otherwise ameliorates that error, that upgrade is selected by the comparison, as depicted in box E4. A single upgrade, or any number of ameliorative upgrades may be selected in response to an error message. Any method known now, or in the future to those skilled in the art to accomplish the selection process may be used, and all such methods are within the scope of the present invention.

Once one or more upgrades are selected, a message suggesting the selected upgrade is then conveyed to a user of the system as depicted in box E5. This may be accomplished through any method known to those skilled in the art. One preferred method is for external computer 42 to directly create an email message that is conveyed to a user of the system over the local computer network 30. A more preferred embodiment conveys information on the selected upgrade to the printer 10. Web server 12, is then used to assemble and convey a message to the user suggesting the selected upgrade. While any method of conveying a message over a network may be used, it is preferred that Web server 12 be used to assemble an email message that is conveyed using SMTP. The message then contains a summary of the selected upgrade and information on how to obtain and install the selected upgrade, thereby improving printer performance. It is preferred that the email, or other message contain HTML "buttons" or links, as known in the art, allowing a user at a workstation 36 to select and install the selected upgrade by clicking on the button. For network printers, it is preferred that the user informed of the selected upgrade be the network administrator, or other person responsible for maintaining printer 10.

Alternatively, printer 10, may be configured to automatically download and install the selected upgrade, upon receipt of the information on the selected upgrade from external computer 42. Such embodiments allow printer efficiency to be improved without the need for any user input.

In some embodiments, an online database 60 of the error messages may be maintained by external computer 42. In these embodiments each error message received by external computer 42 is written into a database 60, as depicted in box E6. It is preferred that if a number of different databases 60 are kept, each database 60 will receive and contain information from a number of printers that are selected in various ways. This may be accomplished through the providing of each database 60 with separate IP addresses, among other possibilities. For example, only printers of a certain model may convey error messages to one database 60. Alternatively, only printers running certain software programs may send error information to a particular database 60. A single printer 10 may send error information to one or more databases 60 at the same time.

Database 60 may be searched and analyzed to provide information on printing errors. This may provide a user, such as a printer manufacturer or printer service provider, with valuable information concerning the occurrence of various errors during actual use of the printers. This information could be analyzed in a wide variety of ways. For example, if database 60 contains error messages from a number of printer models, the frequency of errors involving a single component which is the same in a number of models may be analyzed. This could be used to determine the reliability of that specific component, or the problems that typically occur with that component. By performing this analysis on one component that is supplied by different suppliers, the reliability of the component from different sources could be assessed. Maintaining an error database 60 allows a manufacturer, or other service provider, to track printer errors and design ameliorative upgrades accordingly. This allows the methods and system of the present invention to further improve printer efficiency and reliability, by suggesting upgrades designed in response to the data collected on printer 10 error occurrences.

Accordingly, the present invention includes a method of improving printer productivity. This method includes the following acts. Providing a printer including an error detector for detecting errors in printing functions. Attaching the printer to a network; providing one or more receiving computers in communication with that network, each capable of receiving an error message generated by the printer and conveyed over the network. Using the printer to perform a print job and examining the performance of that print job for errors using the error detector. Creating an error message, including identifying information, when an error is detected. Transmitting the error message over the network and receiving the error message at the receiving computer. Using the receiving computer to compare the identifying information to a set of printer upgrades, to determine if an ameliorative upgrade corresponding to that error message is available. Conveying a message detailing the availability of the ameliorative upgrade. The ameliorative upgrade may then be installed on the printer.

It is preferred that the receiving computer include an error database capable of receiving the error messages on a memory therein. It is further preferred the error messages be retained there, and the database be analyzed to determine the frequency of errors for designing additional ameliorative upgrades to improve printer productivity. The message may be conveyed to the user as discussed above.

The present invention further includes a method of suggesting printer upgrades, comprising the acts of attaching a receiving computer in communication with a network; receiving an error message containing information on a printing error occurring on a printer (including identifying the type of printing error) at that receiving computer; comparing the identifying information to information on a set of printer upgrades, to determine if an ameliorative upgrade corresponding to the error message is available in that set of printer upgrades; and transmitting an availability message suggesting an ameliorative upgrade, if one is available to improve printer function related to that printer error.

It is preferred that this method further include receiving error messages from a number of printers and suggesting ameliorative upgrades for each of those printers. Transmitting an availability message preferably includes conveying information describing the ameliorative upgrade to each printer. Preferably, the printer then assembles an email that is conveyed to a user detailing the ameliorative upgrade. The email may contain HTML buttons allowing the upgrade to be installed. It is further preferred that the method be practiced with a printer incorporating a Web server 12. The Web server 12 may be directly used to download and install the ameliorative upgrade. Optionally, the method may include receiving the error messages into an online database on the receiving computer and retaining the message in that database 60.

The present invention thus advantageously provides methods and systems of suggesting upgrades in response to actual printer errors. Use of the present invention is particularly advantageous for suggesting ameliorative upgrade packages that will reduce the number of errors occurring on existing printers.

It will be appreciated by those skilled in the art that illustrated embodiments herein described are not intended to limit the invention or the scope of the appended claims. Various combinations and modifications of the preferred embodiments could be made without departing from the scope of the present invention and all such modifications are within the scope of the present invention. For example, it is understood that while the methods and apparatus of the present invention have been described in relation to a workstation interacting with a printer, one of skill in the art will recognize that the present invention may be utilized with a wide variety of networked and/or Web-based devices.

Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of improving printer productivity, comprising:
   providing a printer comprising an error detector for detecting errors in printing functions;
   attaching said printer in communication with a network;
   providing at least one receiving computer in communication with said network, said at least one receiving computer capable of receiving an error message generated by said printer and conveyed over said network;
   performing a print job with said printer;
   examining said print job with said error detector for errors;
   creating said error message where said examining reveals an error, said error message containing identifying information regarding said error;
   transmitting said error message to said at least one receiving computer over said network;
   receiving said error message with said at least one receiving computer;
   comparing said identifying information of said error message to a set of printer upgrades for determining the availability of an ameliorative upgrade corresponding to said error message; and
   transmitting an availability message containing information on the ameliorative upgrade to improve printer productivity.

2. The method of claim 1, wherein the at least one receiving computer includes at least one online error database stored within a memory therein, said at least one online error database capable of receiving said error message generated by said printer and conveyed over said network.

3. The method of claim 2, further comprising processing said error message by said at least one receiving computer to retain said error message in said at least one online error database.

4. The method of claim 3, further comprising analyzing said at least one online error database to determine occurrences of errors for designing said ameliorative upgrades to improve said printer productivity.

5. The method of claim 1, where transmitting an availability message further comprises said at least one receiving computer preparing an email message that is conveyed to a user.

6. The method of claim 1, where transmitting an availability message further comprises, conveying information describing said ameliorative upgrade to said printer.

7. The method of claim 6, further comprising said printer preparing an email message containing said information describing said ameliorative upgrade, and transmitting said email message to a user of said printer.

8. The method of claim 7, where said email message contains a HTML button allowing said ameliorative upgrade to be selected and installed.

9. A method of suggesting printer upgrades, comprising:
   attaching a receiving computer in communication with a network; and
   receiving an error message at said receiving computer, said error message containing information on a printing error occurring on a first printer, said information including: identifying information identifying a type of said printing error;
   comparing said identifying information of said error message to information on a set of printer upgrades to determine if an ameliorative upgrade corresponding to said error message is available from said set of printer upgrades; and
   transmitting an availability message containing information on an available ameliorative upgrade to suggest said available ameliorative upgrade to improve printer function related to said printing error.

10. The method of claim 9, further comprising:
    receiving said error message at said receiving computer, said error message containing information on a printing error occurring on a second printer, said information including identifying information identifying the type of said printing error;
    comparing said identifying information of said error message to said information on said set of printer upgrades for determining if said ameliorative upgrade corresponding to said error message is available from said set of printer upgrades; and
    transmitting an availability message containing information on said available ameliorative upgrade to suggest said available ameliorative upgrade to improve said printer function related to said printing error.

11. The method of claim 10, further comprising:
    receiving a plurality of said error messages at said receiving computer, said error messages each containing information on a printing error occurring on a plurality of printers, said information including identifying information identifying the type of said printing error;

comparing said identifying information of said each error message to said information on said set of printer upgrades, to determine if an ameliorative upgrade corresponding to said each error message is available from said set of printer upgrades; and transmitting an availability message containing information on an available ameliorative upgrade to suggest said available ameliorative upgrade to improve printer function related to said printing error.

12. The method of claim 9, where said first printer incorporates a web server.

13. The method of claim 12, where transmitting said availability message further comprises conveying information describing said available ameliorative upgrade to said first printer.

14. The method of claim 12, further comprising said printer preparing an email message containing said information describing said available ameliorative upgrade, and transmitting said email message to a user of said first printer using said web server.

15. The method of claim 14, where said email message contains a HTML button allowing said available ameliorative upgrade to be selected and installed.

16. The method of claim 12, further comprising downloading said available ameliorative upgrade from said network into a memory of said first printer, using said web server.

17. The method of claim 9, wherein said receiving computer includes at least one online error database stored within a memory therein, said at least one online error database capable of receiving said error message generated by said first printer and conveyed over said network.

18. The method of claim 17, further comprising processing said error message at said receiving computer for retaining said error message in said at least one online error database.

* * * * *

UNITED STATES PATENT AND TRADEMARK OFFICE
CERTIFICATE OF CORRECTION

PATENT NO. : 6,652,169 B2 Page 1 of 1
DATED : November 25, 2003
INVENTOR(S) : Travis J. Parry It is certified that error appears in the above-identified patent and that said Letters Patent is hereby corrected as shown below:

Column 1,
Line 51, delete "may be" and insert therefor -- maybe --

Column 3,
Line 3, delete "Aprint job @" and insert therefor -- print job. --
Line 4, delete "Hewlitt" and insert therefor -- Hewlett --
Line 18, delete "(ARIP @)" and insert therefor -- RIP --
Line 19, delete "ARIP'ed @" and insert therefor -- RIP'ed --
Line 23, after "files." delete "@"
Line 23, detete "Aprint" and insert therefor -- print --
Line 40, delete "Anetworks @" and insert therefor -- networks --
Line 41, delete "(the Ainternet @)" and insert therefor -- (the Internet) --

Column 4,
Line 38, delete "Ajob retention @ 25" and insert therefor -- job retention 25 --
Line 50, delete "ARIP'ed @" and insert therefor -- RIP'ed --
Line 52, delete "Aprint" and insert therefor -- print --
Line 61, after "printer 10" delete "is"

Column 6,
Line 3, delete "an" and insert therefor -- and --

Signed and Sealed this

Second Day of August, 2005

JON W. DUDAS
*Director of the United States Patent and Trademark Office*